J. R. BARNES.
SWINE FEEDING RECEPTACLE.
APPLICATION FILED FEB. 13, 1919.

1,301,027.

Patented Apr. 15, 1919.

Inventor
J. R. Barnes,
By
Hiram A. Sturges,
Attorney

UNITED STATES PATENT OFFICE.

JAMES R. BARNES, OF BEAVER CROSSING, NEBRASKA.

SWINE-FEEDING RECEPTACLE.

1,301,027.　　　　　　Specification of Letters Patent.　　Patented Apr. 15, 1919.

Application filed February 13, 1919. Serial No. 276,732.

*To all whom it may concern:*

Be it known that I, JAMES R. BARNES, a citizen of the United States, residing at Beaver Crossing, in the county of Seward and State of Nebraska, have invented certain new and useful Improvements in Swine-Feeding Receptacles, of which the following is a specification.

This invention relates to a feeding receptacle for swine, and has for its principal objects to provide a receptacle for this purpose which will prevent a waste of feed, and which will prevent mud or other objectionable material from being carried to the feed by the swine while feeding. The invention also includes a feed-storage chamber, an annular trough communicating with the chamber, a cone-shaped food-distributer for the bottom of the receptacle in communication with the storage chamber, and means for controlling the supply and movement of the food from the receptacle to the trough, the storage chamber having its least diameter at its top so that movements of the food, whether coarse or fine, will not be unduly impeded by the cone-shaped distributer. The invention also has reference to such an arrangement of parts that stresses incident to its use will be adequately sustained, also that the device will be durable, and may be conveniently and economically manufactured.

With the foregoing objects in view and others to be mentioned hereinafter, the invention presents a novel construction, combination and arrangement of parts as described herein and claimed, and as illustrated in the accompanying drawing, wherein,—

Figure 1:
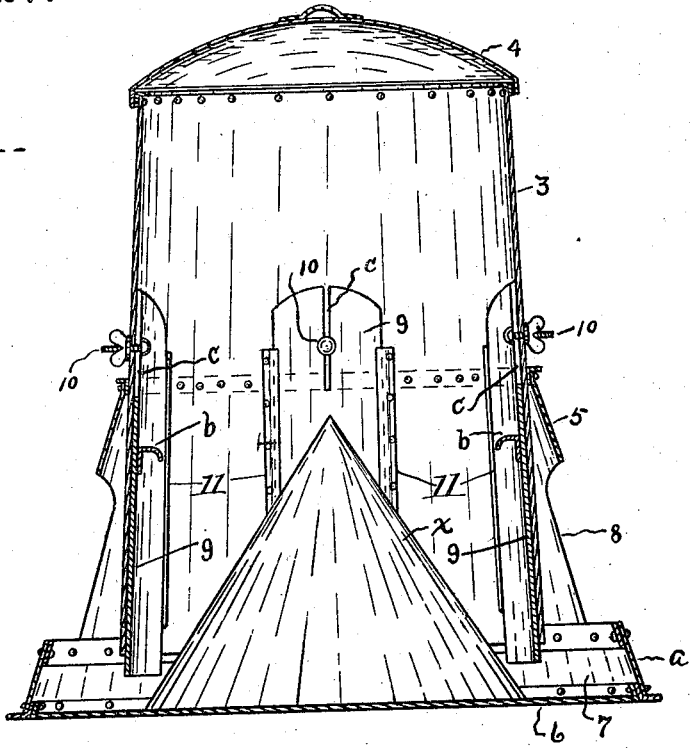
Figure 2:
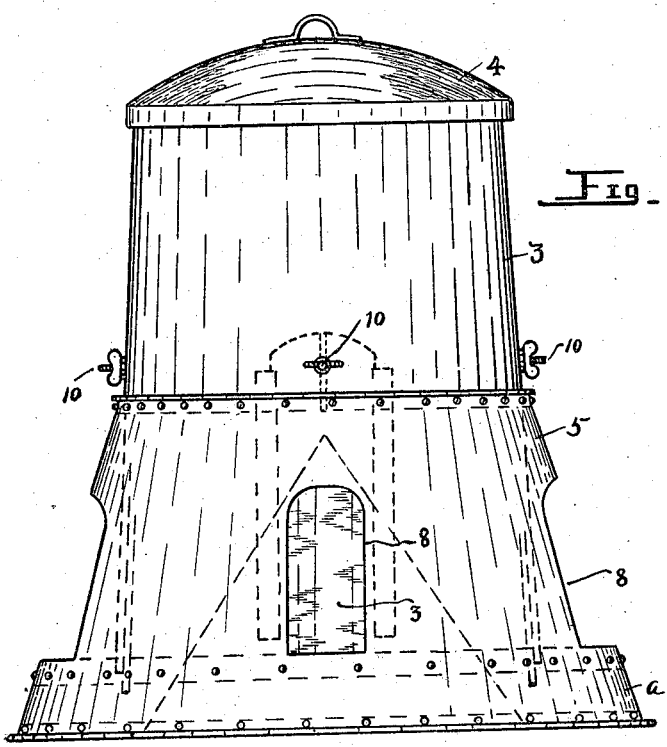

Figure 1 is a view of a swine feeding receptacle in longitudinal section embodying my invention. Fig. 2 is a side view of the same.

Referring now to the drawing for a more particular description, numeral 3 indicates an upright and approximately cylindrical casing, open at its ends, and of any suitable diameter, said casing being provided with a cover 4, and its upper end preferably having a lesser diameter than its lower end.

Secured upon the outer side of the upright casing 3, approximately midway between the ends thereof, is a circular receptacle 5 formed downwardly flaring or divergent, its bottom 6 being disposed somewhat below the lower, open end of the casing 3, and provided centrally thereof with a deflector or food-distributer $x$ of cone-shape. The degree of convergence of the circular wall of the receptacle 5 is greater than that of the casing 3, this difference being so great or considerable, comparatively, that an annular compartment is formed between their walls and also a circular trough 7, said trough being outwardly of the base of the cone, and it will be understood that the use of the cone is for distributing grain or other like feed when placed in the receptacle so that it will enter the trough 7 uniformly, or substantially so.

Numerals 8 indicate feed-openings which are formed in the wall of the receptacle 5, and while I have shown only four of these openings, sufficiently large to admit the head of a swine, I may use a greater or lesser number of openings.

By referring to the drawing it will be seen that the openings 8 are formed in the wall at a sufficient distance above the bottom 6 so that grain, meal or other food will be retained in the trough to advantage, and since that part of the wall $a$, immediately below each opening is inclined upwardly and inwardly of the receptacle the food will not become readily dislodged or wasted by the swine; also the feed-openings are of such form and proportion that the feet and legs of swine will not enter the trough, and mud and foreign substances will not be carried into the trough by the swine when feeding.

In order that the supply or movement of the food to the trough may be under control I provide, upon the inner wall of the casing 3, a plurality of doors 9, adapted to be adjusted longitudinally thereof between the guides 11, each door being disposed between a feed-opening and the cone-shaped distributer $x$, and by use of the handles $b$ an operator may cause the doors to have slidable movements between said guides to project a suitable distance below the lower end of the casing 3, and when thus adjusted they may be secured in fixed relation with said casing by means of the set-screws 10, said screws traversing that part of the casing above the receptacle 5 and engaging in slots $c$ which are formed in the doors.

It will thus be seen that only a limited quantity of food may be admitted to the trough 7 when desired, this being of advantage when certain kinds of food are used, and if the doors are entirely closed, as may be required in some instances, no food could be removed since the feeding of grain, meal or the like, occurs in that part of the trough at the front of each door. It will be noted that the construction provides a receptacle having a comparatively broad base, this obviously being an advantage to prevent undue vibration or overturning of the device.

As shown in the drawing, certain angle-irons or bands are provided for connecting some of the parts, and requiring no particular description, the purpose of said bands being to provide such a construction that stresses incident to the use of the device will be adequately resisted. While I have described details relating to construction, I do not wish to be understood as limiting myself in this respect, and I may make changes in form, size, proportion and minor details as may be found to be of advantage, within the scope of the invention as claimed.

Having fully described my invention, what I claim and desire to secure by Letters Patent is,—

1. In a feeding device, a circular receptacle having an upwardly convergent wall and having its bottom provided centrally thereof with a cone-shaped member, said receptacle wall being provided intermediate its top and bottom with a plurality of feed-openings, an approximately cylindrical casing within and secured to the receptacle with its lower end disposed adjacent to the base of the cone-shaped member, near the bottom of the receptacle, and a plurality of doors mounted upon the wall of the casing, each door being disposed between a feed-opening and said cone-shaped member and arranged to be adjusted longitudinally of the casing to project a selected distance below the lower end of said casing.

2. In a feeding device, a circular receptacle having an upwardly convergent wall provided with a plurality of feed openings, a cone-shaped member in the receptacle, an approximately cylindrical casing having an upwardly convergent wall within and secured to the receptacle with its lower end disposed adjacent to the base of the cone-shaped member and bottom of the receptacle and forming a circular compartment between the walls of said casing and receptacle, and a plurality of doors slidably mounted on the wall of the casing, each door being disposed between a feed opening and said cone-shaped member and arranged to be adjusted longitudinally of the casing to project a selected distance below the lower end of said casing.

3. In a swine feeding device, a circular receptacle having an upwardly convergent wall provided above its bottom with feed-apertures, an upwardly convergent food-distributer disposed centrally within the receptacle, a casing formed upwardly convergent within and having a part projecting above the receptacle, its degree of convergence being less than the degree of convergence of the wall of the receptacle and providing an annular compartment outwardly of said casing, a plurality of doors mounted upon the inner side and movable longitudinally of the casing, each being provided with a slot and disposed between a feed-aperture and said convergent food distributer, and devices mounted on the casing above the wall of the receptacle engaging in the slots for securing said doors in fixed relation with the casing after they have been moved.

In testimony whereof, I have affixed my signature in presence of two witnesses.

JAMES R. BARNES.

Witnesses:
C. M. WARNER,
C. N. GOODELL.